March 27, 1962 J. CIEF 3,026,723

DEVICE FOR TESTING AND ADJUSTING INJECTION PUMPS

Filed Nov. 12, 1957 2 Sheets-Sheet 1

INVENTOR.
Juan Cief
BY Michael S. Striker
Attorney

March 27, 1962          J. CIEF          3,026,723

DEVICE FOR TESTING AND ADJUSTING INJECTION PUMPS

Filed Nov. 12, 1957          2 Sheets-Sheet 2

INVENTOR.
Juan Cief
BY
Michael S. Stoker
Attorney

United States Patent Office 3,026,723
Patented Mar. 27, 1962

3,026,723
DEVICE FOR TESTING AND ADJUSTING
INJECTION PUMPS
Juan Cief, Villa Mugueta, Santa Fe, Argentina
Filed Nov. 12, 1957, Ser. No. 695,933
3 Claims. (Cl. 73—119)

The present invention relates to injection pumps.

More particularly, the present invention relates to devices used with injection pumps for indicating the operating characteristics thereof so that the injection pumps may be properly adjusted.

Although devices are known at the present time for indicating the operating characteristics of an injection pump so that the injection pump may be adjusted accordingly, these devices do not operate precisely and in a reliable manner and are fairly complex.

One of the objects of the present invention is to provide a relatively simple device which is capable of indicating the operating characteristics of an injection pump in a reliable precise fashion so that the injection pump may be properly adjusted.

Another object of the present invention is to provide a device of the above type which is relatively inexpensive as a result of the simplicity of the components thereof and the ease with which these components are assembled and disassembled from each other.

Another object of the present invention is to provide a device of the above type which is capable of operating either with individual injection pumps or with groups of injection pumps.

It is also an object of the present invention to provide an injection pump device capable of indicating the operating characteristics thereof and which is so easy to operate that a minimum amount of time is required for an operator to learn to operate the device.

With the above objects in view, the present invention includes in a device for indicating the operation of an injection pump which has a cylinder provided with fuel intake and discharge ports as well as a piston means slidable in the cylinder from a position where these ports are open to a position where the ports are closed by the piston means and then to a position where the fuel discharge port is opened by the piston means, a conduit means which is adapted to be removably connected with the injection pump in a position communicating with the cylinder thereof and which is adapted to be connected with a source of fluid under pressure so that this fluid under pressure flows through the conduit means into the cylinder and out through the ports thereof until these ports are closed by the piston means, whereupon the pressure of the fluid in the conduit means builds up. The device of the present invention includes, further, a pressure-sensitive means which communicates with the conduit means for indicating the increase in the pressure of the fluid thereof, and an indicating means which cooperates with the pressure-sensitive means for indicating when the pressure-sensitive means senses the increase in pressure as well as the decrease in pressure which occurs when the piston means uncovers the fuel discharge port of the cylinder. Also, there is in cooperation with the conduit means a means for registering the axial movement of the piston means, so that the extent of axial movement thereof is also indicated by the device of the present invention.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which:

Figure 1:
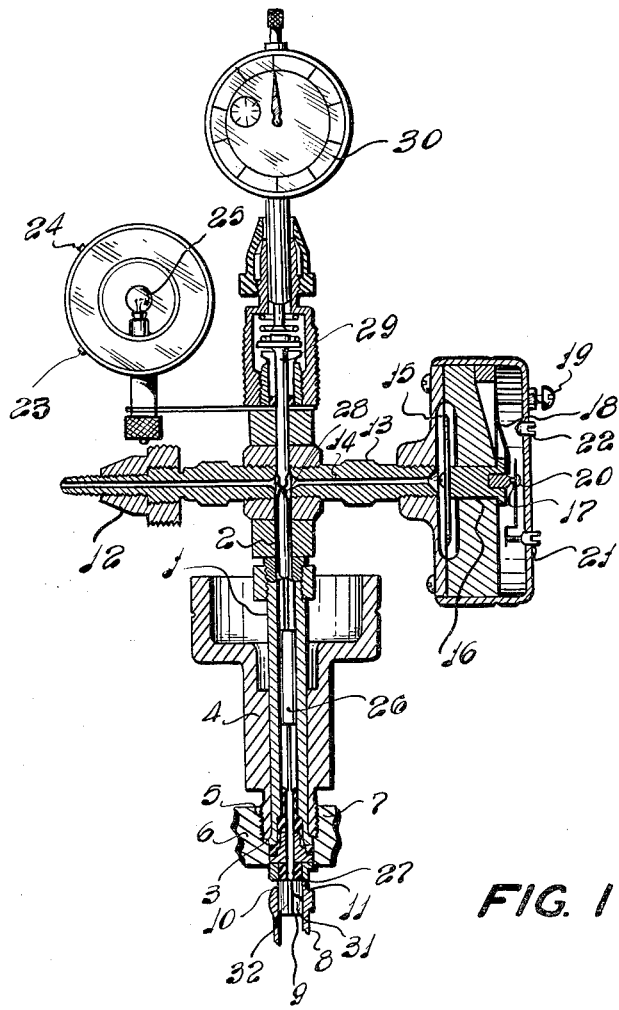
FIG. 1 is an axial sectional view taken along a central plane of a device for testing and adjusting injection pumps which embodies the invention.
Figure 2:
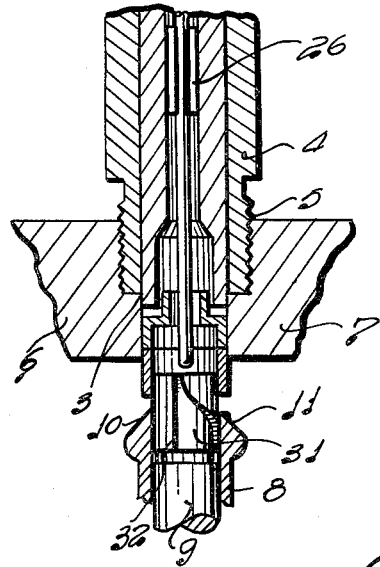
FIG. 2 is an enlarged sectional view of the lower part of the device shown in FIG. 1.
Figure 3:
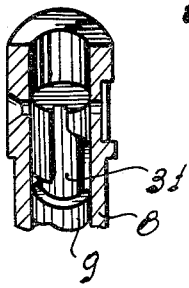
FIG. 3 is a partly sectional fragmentary perspective view of a detail of the part shown in FIG. 2.

Referring now to FIGS. 1 and 2 of the drawing, the device of the invention includes an elongated tube or conduit means 1 which extends through a handle member 4 provided at its bottom end with threads 5. Through the medium of the handle member 4 with the threads 5 thereof the tube or conduit 1 of the device of the present invention is adapted to be removably connected with the injection pump which is to be tested. This injection pump is indicated only fragmentarily in FIGS. 1 and 2 and includes the outer housing wall 7 provided with a threaded bore which receives the threaded end of the handle 5 and thus receives the conduit or tube 1. In addition to the housing 7 the injection pump 6 includes the cylinder 8 provided with the fuel intake port 10 and a fuel discharge port 11, and the piston means 9 is axially slidable in a known way in the cylinder 8 of the injection pump. As shown additionally in the perspective view of FIG. 3, the piston means 9 which is axially reciprocated by the structure of the injection pump in a well known manner is formed at its outer surface with an axial groove 32 and with a helical groove 31. The angular position of the piston means 9 with respect to its axis is adjusted in a known way so that a predetermined portion of the helical groove 31 coincides with the fuel discharge port 11 of the cylinder 8 when the piston 9 is moved upwardly beyond the position thereof shown in FIG. 1 of the drawing to the position which it takes at the end of the fuel supply stroke. The piston means 9 is movable, as is well known, from a position below the ports 10 and 11, where both of them are open, to a position shown in FIG. 1 of the drawing where both of the ports 10 and 11 have just been closed by the piston means 9. From this point on as the piston means 9 continues to move upwardly fuel injection will take place until the piston means 9 has reached an axial position where the helical groove 31 cooperates with the fuel discharge port 11, so that at this time fuel in the pressure chamber of the pump will discharge through the axial groove 32 and the helical groove 31 as well as the discharge port 11, and this is the action which takes place at the end of the injection of fuel.

The structure of the present invention is capable of indicating on the one hand the extent of the axial movement of the piston means 9 and on the other hand the moment when the ports 10 and 11 are covered by the piston means 9 as well as the moment when the helical groove 31 comes into alignment with the discharge port 11. In this way the injection pump may be regulated by the operator so that the moment of fuel injection harmonizes properly with the position of the piston of the cylinder of the engine which is to receive fuel, and similar adjustments are carried out.

The tube 1 of the structure of the present invention which is removably connected with the wall 7 of the injection pump 6 through the threads 5 received in a threaded bore of the wall 6, these threads 5 forming part of the handle 4, is connected with a conduit means which leads to a source of fluid under pressure such as compressed air, and it has been found that satisfactory results are obtained when this compressed air has a pressure of 90 grams per square centimeter. This conduit means which serves to connect the interior 2 of the tube 1 with the source of fluid under pressure takes the form of a tube fixed to and branching to the left from the tube 1, as viewed in the drawing, this latter conduit which branches to the left having a connecting element 12 adapted to be connected with the source of compressed air or the like. Of course, the interior 2 of the tube 1 communicates directly with the interior of the cylinder 8, so that as long as the ports 10 and 11 are not covered by the piston means 9 the fluid under pressure flowing through the interior space 2 of the tube 1 will flow out through the ports 10 and 11 of the cylinder 8.

A pressure-sensitive means communicates with the interior 2 of the tube 1 in order to sense the increase in pressure which occurs in the interior of the tube 1 when the ports 10 and 11 are closed at the instant when the piston means 9 has reached the position indicated at the lower part of FIG. 1 of the drawing. This pressure-sensitive means includes an elongated tube 13 fixed to and branching to the right from the tube 1, as viewed in FIG. 1, and formed with an axial bore 14. The interior of the bore 14 communicates with one side of a flexible resilient diaphragm 15 fixedly carried at its outer periphery in the interior of a suitable housing, and this diaphragm is connected at its side opposite from the bore 14 to an axially shiftable plunger 16 which carries at its end distant from the diaphragm 15 an electrical contact 17. The outer wall of the housing which carries the diaphragm 15 is provided with a pair of electrical connector elements 21 and 22, and a stationary contact 20 which is located in the path of movement of the contact 17 which moves with the plunger 16 and diaphragm 15 is connected electrically with the connector 21. A leaf spring 18 is fixedly carried by a transverse wall of the diaphragm housing, and the right end wall of this housing threadedly carries a screw member 19 which bears against the leaf spring 18, the bottom free end of the leaf spring 18, as viewed in the drawing, bearing against the right end of the plunger 16, as viewed in the drawing. Thus, by turning the screw 19 it is possible to adjust the pressure of the spring 18 on the plunger 16, and in this way it is possible to adjust the force required to shift the diaphragm 15 to the right, as viewed in the drawing, through a distance necessary to place the movable contact 17 in engagement with the stationary contact 20.

Figure 4:
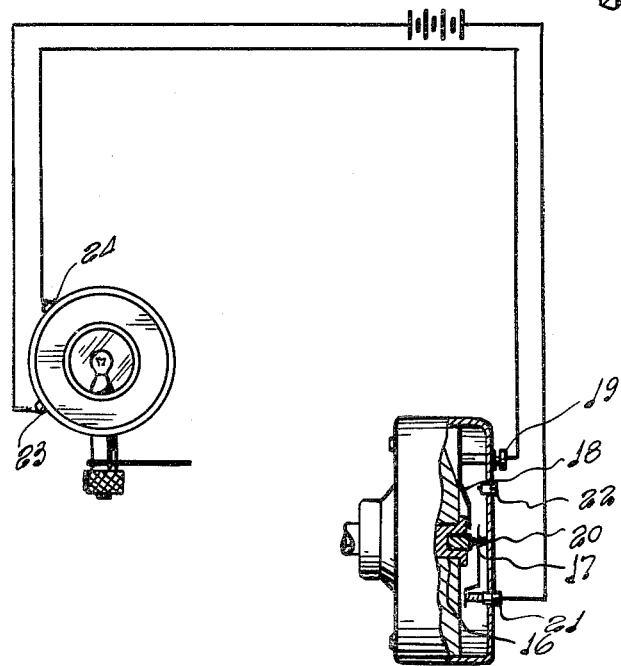
FIG. 4 is a diagrammatic view of an electrical circuit including the indicating means and the pressure-sensitive means of the device, the pressure sensitive means being shown partially in section.

The device of the present invention further includes an indicating means for indicating when the above-described pressure-sensitive means senses the increase in pressure in the interior 2 of the tube 1. This indicating means is electrical and includes the lamp 25 carried by a suitable supporting structure which in turn is carried by the tube 1. The lamp 25 is electrically connected, as shown diagrammatically in FIG. 4, in a circuit which includes the electric connector elements 22 and 24, and these elements are adapted to be connected through suitable conductors with the connectors 21 and 22, the circuit being such that when the movable contact 17 engages the stationary contact 20 the circuit through the lamp 25 will be closed and the latter will be illuminated to indicate that the pressure has increased in the interior 2 of the tube 1. Thus, when the operator sees that the lamp 25 has become illuminated he knows that the piston means 9 has reached the position where the ports 10 and 11 are closed.

The structure of the present invention includes an additional indicator means for indicating the extent of axial movement of the piston means 9, and this latter means includes an elongated rod 26 which is located in the interior of the tube 1 and is freely slidable therein in an axial direction without obstructing the interior 2 of the tube 1. Thus, the rod 26 may be provided with fins which extend radially out from the rod 26 into slidable engagement with the inner surface of the tube 1, so that in this way the rod 26 is capable of shifting axially in the tube 1 without obstructing the flow of fluid therethrough. The rod 26 extends with clearance through an axially bored element located at the top end of the cylinder 8 within the wall 7 of the injector pump 6, and below this axially bored element the rod 26 has an end 27 which engages the top face of the piston means 9. The axially bored element through which the rod 26 freely extends with clearance forms a part of the device of the invention and is inserted into the opening of the wall 7 of the injection pump 6 together with the remainder of the device and is retained therein when the threads 5 are connected with the wall 7 of the injector pump 6.

The top end 28 of the rod 26 engages the bottom end of a second rod 29 which is axially shiftable in a fourth tube which is coaxial with the tube 1 and forms an extension thereof as indicated in FIG. 1 of the drawing. This fourth tube carries an indicator 30 of known construction which is capable of indicating the extent of axial movement of the rod 29 and thus of the rod 26 which moves together with the rod 29. Thus, with this arrangement the indicator 30 will indicate the extent of axial movement of the rod 26 and thus of the piston 9, while the lamp 25 will indicate when the ports 10 and 11 are closed.

When the structure of the invention is used, it is connected in the above-described manner to an injection pump, and then the drive shaft of the injection pump is turned by hand by the operator. During the time that the compressed air flows through the openings 10 and 11 there will be no illumination of the lamp 25, and the operator knows that the piston 9 has not yet reached the position where it closes the ports 10 and 11. Of course, after the device of the invention has been connected to the wall 7 of the injection pump 6, the element 12 is connected with a suitable source of compressed air, for example. The operator continues to turn the drive shaft of the injection pump by hand until he notices that the lamp 25 is illuminated, and he knows that at this time the piston has reached the position where the ports 10 and 11 are closed. The screw 19 is preset with respect to the air pressure in the interior 2 of the tube 1 so that when the piston 9 just closes the ports 10 and 11 there is a build up of pressure which through the diaphragm 15 shifts the plunger to the right to the position where the contact 17 engages the contact 20 in order to close the circuit of the lamp 25.

With the piston in this position where it has just closed the ports 10 and 11 the operator makes the necessary adjustments so as to correlate the injection pump with the proper moment in the cycle of operation of the piston and cylinder of the engine which is to be supplied with fuel. Also, at this time, the operator zeroes the indicator 30, so that when the operator then continues the axial movement of the piston 9 the indicator 30 will indicate the extent of axial movement of the piston 9 required to place the helical groove 31 in communication with the fuel discharge port 11. As soon as the groove 31 reaches the port 11 the fluid in the conduit 1 will discharge through the port 11 and there will be a drop in pressure so that the spring 18 will return the plunger 16 and the diaphragm 15 to a position where the movable contact 17 is no longer in engagement with the stationary contact 20, and thus the lamp 25 will become extinguished. Thus, when the lamp 25 becomes extinguished the operator knows that the groove 31 has reached the discharge port 11, and the indicator 30 indicates the extent of axial movement of the piston 9 from the position shown in FIG. 1 of the drawing to the position where the groove 31 communicates with the port 11, so that in this way the operator can determine the amount of fuel ejected during each stroke of the piston. The operator continues to move the drive shaft of the injection pump so as to determine how much further the piston moves till it reaches its top dead center position. Thus, with the device of the invention the operator can quickly and easily determine when the piston means 9 has just closed the ports 10 and 11, the extent of axial movement of the piston means 9 from the latter point up to the point where the groove 31 communicates with the port 11, and then the extent of axial movement of the piston 9 until it reaches its top dead center position.

After the injection pump has been adjusted in accordance with the operating characteristics thereof indicated by the device of the invention, it is a simple matter to unscrew the handle 4 from the wall 7 of the injection pump so that the latter and the device of the invention may be separated from each other and another test carried out on the next injection pump in the manner described above.

No mention is made of the actual adjustments made on the injection pump because these are purely conventional.

It will be understood that each of the elements described above, or two or more together, may also find a useful application in other types of injection pumps differing from the types described above.

While the invention has been illustrated and described as embodied in injection pump testing devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for indicating the operating characteristics of an injection pump which has a cylinder provided with fuel intake and discharge ports and which has a piston means slidable therein for closing said ports during a predetermined part of the axial movement of said piston means and for opening said discharge port when said piston means moves to another predetermined axial position, said device including an elongated tube adapted to be removably connected with the injection pump in a position communicating with the interior of said cylinder thereof; a first conduit branching from and communicating with said tube and adapted to be connected with a source of fluid under pressure so that the fluid flows along the interior of said tube and discharges through said ports until the latter are closed by said piston means whereupon the pressure of the fluid increases in said tube; a second conduit means branching from and communicating with said tube; a pressure-sensitive means including a diaphragm, said pressure-sensitive means being carried by said second conduit means with the interior of the latter communicating with one side of said diaphragm so that said diaphragm moves upon an increase in the pressure of the fluid in said tube; means carried by said pressure-sensitive means for regulating the force necessary to move said diaphragm thereof; electrical indicating means cooperating with said pressure-sensitive means for indicating when the diaphragm moves upon an increase in the pressure of the fluid in said tube; third conduit means branching from and communicating with said tube, said third conduit means being coaxial with said tube; an elongated rod freely shiftable axially in said tube and being located with clearance in the latter, said rod engaging at one of its ends said piston means so that said rod moves axially with said piston means; and means carried by said third conduit means and cooperating with said rod for registering the extent of axial movement thereof so as to indicate the extent of axial movement of said piston.

2. A device for indicating the operating characteristics of an injection pump which has a cylinder provided with fuel intake and discharge ports and which has a piston means slidable in said cylinder from a position where both of said ports are open to a position where said ports are closed and then through a position where said fuel discharge port is opened, said device comprising, in combination, a first elongated tube adapted to be removably connected with the injection pump in a position communicating with the interior of said cylinder; a second tube communicating with and extending from said first tube and adapted to be connected with a source of fluid under pressure, so that the fluid under pressure flows along the interior of said first tube and escapes through said ports until they are covered by said piston means; a third tube communicating with and extending from said first tube; a housing carried by said third tube and having a hollow interior communicating with said third tube; a flexible, resilient diaphragm extending across the interior of said housing and having one face directed toward the interior of said third tube so that said diaphragm responds to the increase in pressure in the interior of said first tube when said ports are closed by said piston means; spring means carried by said housing and cooperating with said diaphragm for resisting the movement thereof by the fluid under pressure in said tubes; adjustment means cooperating with said spring means for adjusting the force thereof; switch means carried by said housing and adapted to be closed when said diaphragm moves through a predetermined distance; a lamp located adjacent said first tube; electrical means cooperating with said lamp and switch means for causing a circuit through said lamp to be closed in order to illuminate said lamp when said switch means is closed by movement of said diaphragm, whereby said lamp will indicate when the pressure of the fluid in said tubes increases upon closing of said ports by said piston means; an elongated rod extending with clearance along the interior of said first tube and engaging said piston so as to be axially movable therewith; a fourth tube coaxial with and extending from said first tube and communicating therewith; and means carried by said fourth tube and communicating with said rod for indicating the extent of axial movement of said rod in said tube, whereby the device is capable of indicating when the ports of the cylinder are closed and opened and the extent of axial movement of the piston so that the injection pump may be properly adjusted.

3. A device according to claim 2, said fluid under pressure being compressed air having a pressure of approximately 90 grams per square centimeter.

References Cited in the file of this patent

UNITED STATES PATENTS

| 1,683,710 | Zitzman | Sept. 11, 1928 |
| 2,183,189 | Gormley | Dec. 12, 1939 |

FOREIGN PATENTS

| 538,789 | Great Britain | Aug. 18, 1941 |
| 736,781 | Great Britain | Sept. 14, 1955 |